US012809000B2

(12) United States Patent
Suzuki

(10) Patent No.: US 12,809,000 B2
(45) Date of Patent: Nov. 24, 2026

(54) CONTROL APPARATUS, LASER RADAR APPARATUS, CONTROL METHOD, STORAGE MEDIUM, ON-BOARD SYSTEM, AND MOVING APPARATUS

(71) Applicant: CANON KABUSHIKI KAISHA, Tokyo (JP)

(72) Inventor: Noriaki Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 18/352,384

(22) Filed: Jul. 14, 2023

(65) Prior Publication Data

US 2024/0077591 A1 Mar. 7, 2024

(30) Foreign Application Priority Data

Sep. 7, 2022 (JP) ................................ 2022-141963

(51) Int. Cl.
*B60Q 9/00* (2006.01)
*B60T 7/22* (2006.01)
(Continued)

(52) U.S. Cl.
CPC .............. *G01S 7/484* (2013.01); *B60Q 9/008* (2013.01); *B60T 7/22* (2013.01); *G01S 17/931* (2020.01)

(58) Field of Classification Search
CPC ........... B60Q 9/008; B60T 7/22; G01S 17/10; G01S 17/42; G01S 17/931; G01S 7/4817
See application file for complete search history.

(56) References Cited

U.S. PATENT DOCUMENTS

2020/0033474 A1* 1/2020 Petit ........................ G01S 17/42
2020/0200910 A1 6/2020 Pan
(Continued)

FOREIGN PATENT DOCUMENTS

JP 3156690 B2 4/2001
JP 2009-041928 A 2/2009
(Continued)

OTHER PUBLICATIONS

Notice of Reasons for Refusal issued by the Japanese Patent Office on Nov. 26, 2024 in corresponding JP Patent Application No. 2022-141963, with English translation.
(Continued)

*Primary Examiner* — Charles J Han
(74) *Attorney, Agent, or Firm* — Carter, DeLuca & Farrell LLP

(57) ABSTRACT

A control apparatus is configured to control a laser radar apparatus that includes a scanner and a detector and to acquire information about an object based on an output from the detector. The control apparatus causes the light source to emit a first laser beam having a first output value and a second laser beam having a second output value smaller than the first output value, acquires information about the object in a first scanning range in a scanning range of the scanner in a case where the first laser beam is emitted, and acquires information about the object in a second scanning range in the scanning range of the scanner closer to the scanner than the first scanning range in a case where the second laser beam is emitted.

15 Claims, 11 Drawing Sheets

(51) Int. Cl.
*G01S 7/484* (2006.01)
*G01S 17/931* (2020.01)

(56) References Cited

U.S. PATENT DOCUMENTS

| | | | | |
|---|---|---|---|---|
| 2022/0134940 | A1* | 5/2022 | Thiessen | F21S 43/31<br>356/4.01 |
| 2024/0046658 | A1* | 2/2024 | Lim | G01S 7/4802 |

FOREIGN PATENT DOCUMENTS

| | | | |
|---|---|---|---|
| JP | 2016-205962 | A | 12/2016 |
| JP | 2019-109143 | A | 7/2019 |
| JP | 2019-138630 | A | 8/2019 |
| JP | 2020-509389 | A | 3/2020 |
| JP | 2021511483 | A | 5/2021 |
| JP | 2021-148756 | A | 9/2021 |
| JP | 2021-152469 | A | 9/2021 |
| WO | 2011/138895 | A1 | 11/2011 |
| WO | 2018037900 | A1 | 3/2018 |

OTHER PUBLICATIONS

Notice of Reasons for Refusal issued by the Japanese Patent Office on Jul. 23, 2024 in corresponding JP Patent Application No. 2022-141963, with English translation.

Notice of Reasons for Refusal issued by the Japanese Patent Office on Apr. 23, 2024 in corresponding JP Patent Application No. 2022-141963, with English translation.

Decision of Refusal issued by the Japanese Patent Office on Mar. 18, 2025 in corresponding JP Patent Application No. 2022-141963, with English translation.

Notice of Reasons for Refusal issued by the Japanese Patent Office on Apr. 14, 2026 in corresponding JP Patent Application No. 2025-099190, with English translation.

Decision of Refusal issued by the Japanese Patent Office on Jun. 23, 2026 in corresponding JP Patent Application No. 2025-099190, with English translation.

* cited by examiner

CONTROL APPARATUS, LASER RADAR APPARATUS, CONTROL METHOD, STORAGE MEDIUM, ON-BOARD SYSTEM, AND MOVING APPARATUS

BACKGROUND

Technical Field

One of the aspects of the embodiments relates to a control apparatus, a laser radar apparatus, a control method, a storage medium, an on-board system, a moving apparatus.

Description of Related Art

A laser radar apparatus has conventionally been known that performs object detection and distance measurement by irradiating the object with a laser beam and detecting light reflected from the object.

Japanese Patent No. 3156690 discloses a configuration for branching a laser beam into a plurality of laser beams having different intensities and controlling the intensity of each of the plurality of laser beams.

However, the configuration disclosed in Japanese Patent No. 3156690 requires an optical member for branching one laser beam into a plurality of laser beams with different intensities. In addition, this configuration requires a plurality of scanning mechanisms for scanning the plurality of laser beams and a control mechanism for causing the plurality of laser beams to be selectively emitted.

SUMMARY

A control apparatus according to one aspect of the embodiment is configured to control a laser radar apparatus that includes a scanner configured to deflect a laser beam from a light source, to scan an object, and to deflect reflected light from the object, and a detector configured to detect the reflected light, and acquire information about the object based on an output from the detector. The control apparatus includes a memory storing instructions, and a processor configured to execute the instructions to cause the light source to emit a first laser beam having a first output value by causing a first signal having a first signal value to be supplied to the light source, and cause the light source to emit a second laser beam having a second output value smaller than the first output value by causing a second signal having a second signal value smaller than the first signal value to be supplied to the light source, and acquire information about the object in a first scanning range in a scanning range of the scanner in a case where the first laser beam is emitted, and acquire information about the object in a second scanning range in the scanning range of the scanner closer to the scanner than the first scanning range in a case where the second laser beam is emitted. A laser radar apparatus having the above control apparatus, and a control method corresponding to the above control apparatus also constitute another aspect of the embodiment. A storage medium storing a program that causes a computer to execute the above control method also constitutes another aspect of the embodiment. An on-board system and a moving apparatus each including the above laser radar apparatus also constitute another aspect of the embodiment.

Further features of the disclosure will become apparent from the following description of embodiments with reference to the attached drawings.

DESCRIPTION OF THE EMBODIMENTS

Figure 1:
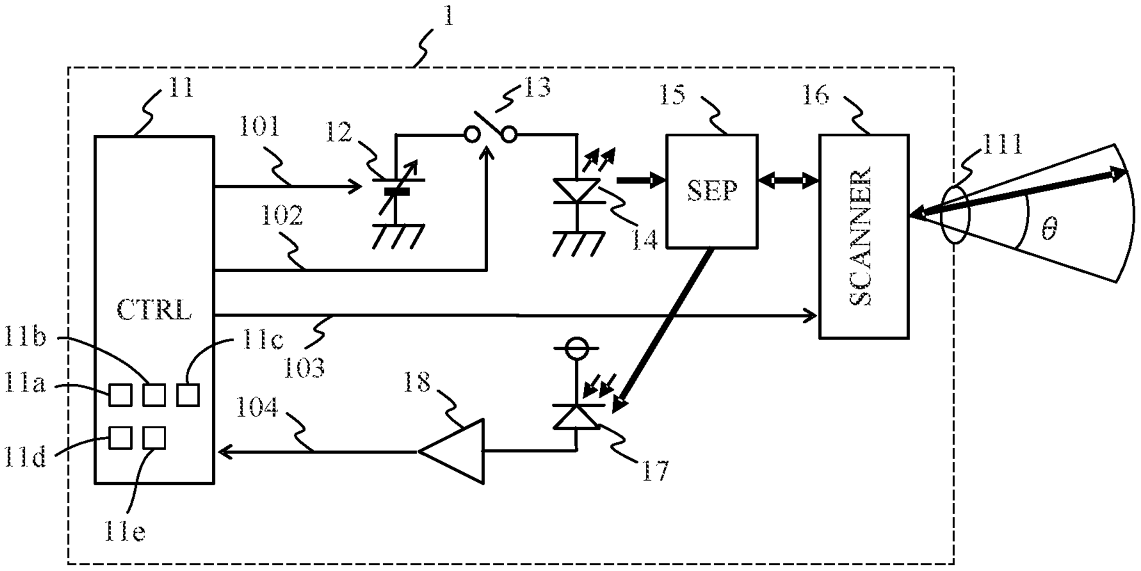
FIG. 1 is a configuration diagram of a laser radar apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a configuration diagram of a laser radar apparatus 1 according to this embodiment. The laser radar apparatus 1 includes a control unit (control apparatus: CTRL) 11, a variable power supply unit (VPSU) 12, a pulse driving unit 13, a laser emitter (light source) 14, a separator (SEP) 15, a scanner 16, a detector 17, an amplifier 18, and an optical member 111.

The control unit 11 includes a port for inputting and outputting high and low binary values and arbitrary voltage values, a controller having a timer function for measuring time, and the like. The control unit 11 also includes an output control unit 11*a*, an on/off control unit 11*b*, a scanning control unit 11*c*, an acquiring unit 11*d*, and a display control unit 11*e*.

The output control unit 11*a* outputs a signal indicating a control voltage value relating to the intensity of the laser beam emitted from the laser emitter 14 via the power control line 101. In this embodiment, the output control unit 11*a* outputs a signal indicating a first control voltage value to the variable power supply unit 12 via the power control line 101 so that the variable power supply unit 12 supplies a first signal having a first signal value to the laser emitter 14. In a case where the variable power supply unit 12 supplies the first signal to the laser emitter 14, the laser emitter 14 emits a first laser beam having a first output value. In addition, the output control unit 11*a* outputs a signal indicative of a second control voltage value to the variable power supply unit 12 through the power control line 101 so that the variable power supply unit 12 supplies a second signal having a second signal value smaller than the first signal value to the laser emitter 14. In a case where the variable power supply unit 12 supplies the second signal to the laser emitter 14, the laser emitter 14 emits a second laser beam having a second output value smaller than the first output value.

The on/off control unit 11*b* outputs a pulsed waveform signal (pulse signal) for each distance measurement point via a pulse control line 102, and controls a turning-on state (ON state) and a turning-off state (OFF state) of the pulse driving unit 13.

The scanning control unit 11*c* outputs a signal indicating a control voltage value relating to the angle of the laser beam via the scanning control line 103, and controls a scanning angle θ of the scanner 16.

The acquiring unit 11*d* receives a signal relating to reflected light from an object (target) detected via a pulse detecting line 104, and acquires information relating to the object based on the received signal. In this embodiment, in a case where the first laser beam is emitted, the acquiring unit 11*d* acquires information about the object in a first scanning range in the scanning range of the scanner 16. In a case where the second laser beam is emitted, the acquiring unit 11*d* acquires information about the object in a second scanning range of the scanning range of the scanner 16, which is closer to the scanner 16 than the first scanning range. Here, acquiring information about the object includes detecting the object and calculating (measuring) a distance to the object.

The display control unit 11*e* causes an unillustrated display unit to display information as a combination of the information about the object in the first scanning range and the information about the object in the second scanning range.

The variable power supply unit 12 changes the output voltage and/or current according to a signal indicating the control voltage value input via the power control line 101.

The pulse driving unit 13 includes a MOS-FET, a transistor, or the like, and turns on (reaches the ON state) in a case where the output value of the pulse signal output from the pulse control line 102 becomes higher than a predetermined threshold voltage, and turns off (reaches the OFF state) in a case where the output value of the pulse signal output from the pulse control line 102 does not become higher than the predetermined threshold voltage.

The laser emitter 14 includes a laser diode or the like, and emits a laser beam (emits pulses) according to the output according to the magnitude of the voltage and/or current output by the variable power supply unit 12 toward the separator 15 while the pulse driving unit 13 is turned on.

The separator 15 includes a lens and a mirror, and transmits or reflects at least part of the laser beam emitted from the laser emitter 14 and emits it toward the scanner 16. The separator 15 reflects or transmits at least part of the reflected light from the object received by the scanner 16 and emits it toward the detector 17 as detected light.

The scanner 16 has a movable reflective surface such as a motor-driven mirror or a Micro Electro Mechanical Systems (MEMS) mirror, deflects the laser beam emitted from the laser emitter 14 to scan the object, and deflects the reflected light from the object. More specifically, the scanner 16 emits the laser beam from the separator 15 at a predetermined scanning angle θ according to the signal indicating the control voltage value input via the scanning control line 103, and emits to the separator 15 the reflected light from the object, which is incident at the scanning angle θ.

The optical member 111 includes a light transmitting member such as a lens, and is configured to prevent dust from entering the laser radar apparatus 1 and to detect an object at a long distance.

The detector 17 includes a photoelectric conversion element such as an avalanche photodiode (APD) and outputs a current according to the detected light.

The amplifier 18 converts and amplifies the current output by the detector 17 into a signal relating to the reflected light from the object at a voltage level recognizable by the control unit 11, and outputs the signal.

Figure 2:
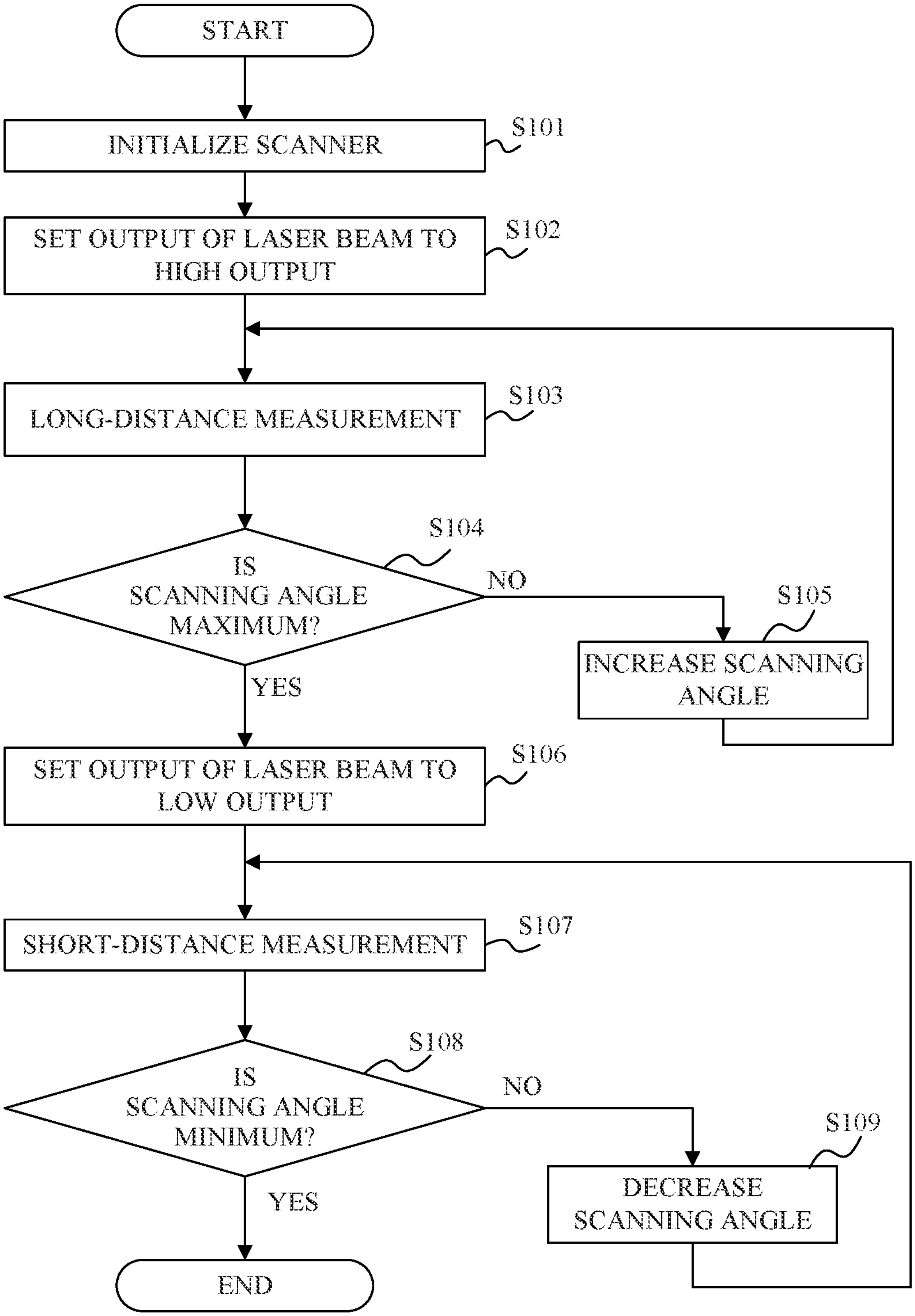
FIG. 2 is a flowchart illustrating a control operation by a control unit according to a first embodiment.
Figure 3:
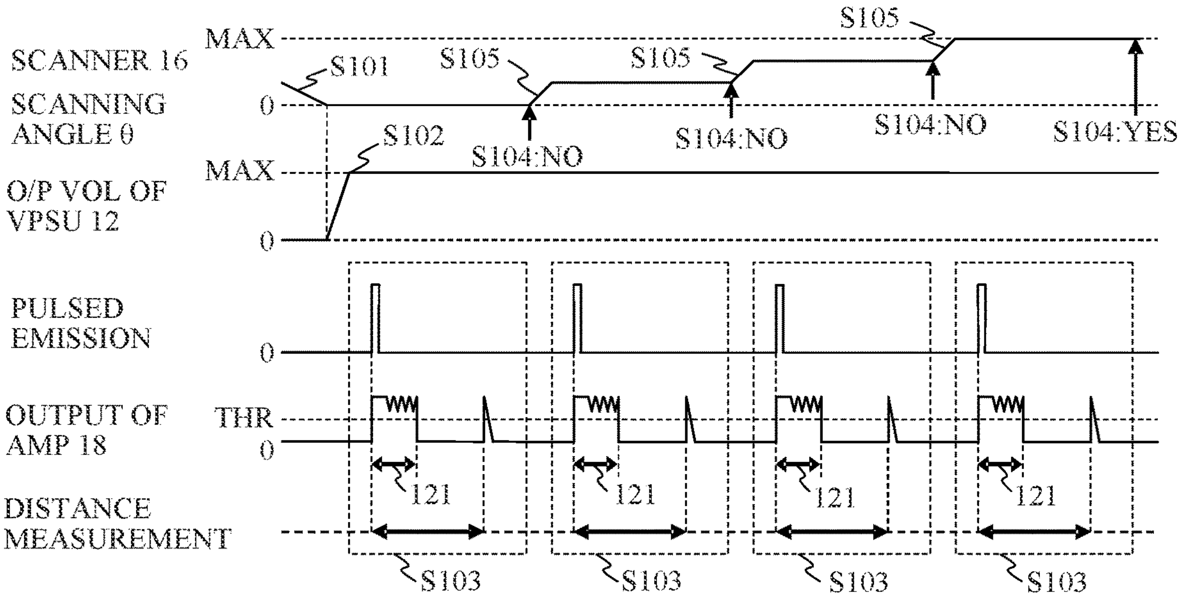
FIG. 3 illustrates a waveform of each part in each processing from step S101 to step S105 in FIG. 2.
Figure 4:
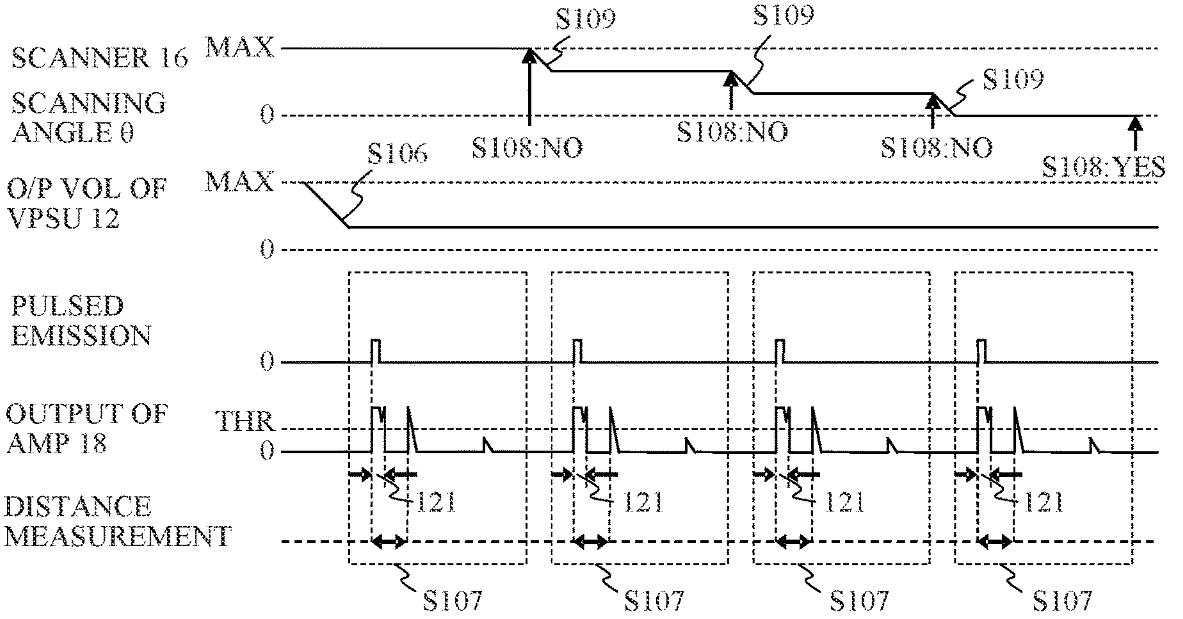
FIG. 4 illustrates a waveform of each part in each processing from step S106 to step S109 in FIG. 2.

FIG. 2 is a flowchart illustrating the control operation by the control unit 11 according to this embodiment. In a case where the laser radar apparatus 1 starts operating, the flow of FIG. 2 is started. FIG. 3 illustrates a waveform of each part in each processing from step S101 to step S105 in FIG. 2. FIG. 4 illustrates a waveform of each part in each processing from step S106 to step S109 in FIG. 2. In FIGS. 3 and 4, the horizontal axis is time.

In step S101, the control unit 11 initializes the scanner 16. More specifically, the control unit 11 controls the scanner 16 so that a scanning angle θ of the scanner 16 becomes a minimum value (zero in this embodiment).

In step S102, the control unit 11 controls the voltage and/or current output from the variable power supply unit 12 to set the output of the laser beam emitted from the laser emitter 14 to a relatively large state (high output).

In step S103, the control unit 11 performs long-distance measurement. More specifically, the control unit 11 first emits a high-power laser beam (first laser beam) from the laser emitter 14 through the separator 15 and the scanner 16. Next, the control unit 11 receives a signal relating to the reflected light from the object detected by the detector 17 and converted and amplified by the amplifier 18. Then, the control unit 11 calculates (measures) a distance to the object using a period from the time when the pulse driving unit 13 is controlled to the turning-on state to the time when the signal from the amplifier 18 is received.

In step S104, the control unit 11 determines whether the scanning angle θ of the scanner 16 is the maximum value. In a case where the control unit 11 determines that the scanning angle θ is the maximum value, the processing of step S106 is executed. In a case where the control unit 11 determines that the scanning angle θ is not the maximum value, the processing of step S105 is executed.

In step S105, the control unit 11 controls the scanner 16 so as to increase the scanning angle θ of the scanner 16.

By repeating the processing of steps S103 and S105, the laser emitter 14 emits a high-power laser beam, and object detection and distance measurement can be sequentially performed in a scanning range (first scanning range) 124, which is a long distance in the scanning range of the scanner 16.

Here, in a case where a laser beam enters a transparent member or a reflective member inside the laser radar apparatus 1, part of the laser beam may be diffused and become so-called stray light 122, which may enter the detector 17. Since the stray light 122 has intensity higher than that of reflected light from a distant object, waveform distortion occurs inside the detector 17 and/or the amplifier 18. Therefore, as illustrated in FIG. 3, a stray light saturation time 121 is generated in which the output of the amplifier 18 is distorted from the time when the laser emitter 14 emits a pulse. The stray light saturation time 121 increases as the intensity of the stray light 122 increases.

Figure 5:
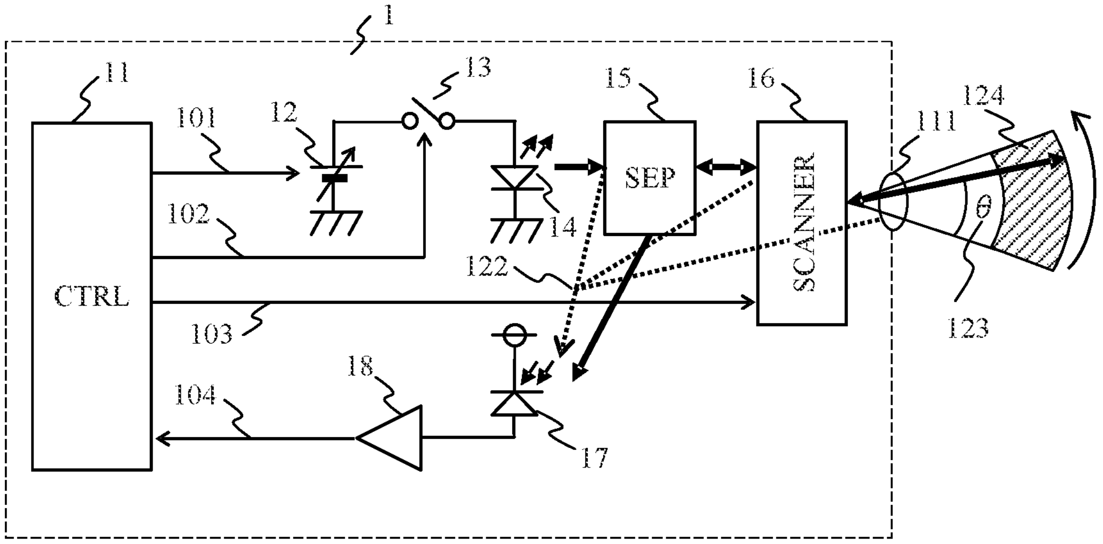
FIG. 5 illustrates how stray light enters a detector and a scanning range in step S103 of FIG. 2.

FIG. 5 illustrates how the stray light 122 enters the detector 17 and the scanning range in step S103 of FIG. 2. Since the reflected light from an object cannot be detected during the stray light saturation time 121, object detection and distance measurement in the corresponding scanning range 123 cannot be performed.

The control unit 11 may control the peak power of the laser beam corresponding to the specific pixel by outputting a dummy pulse signal through the pulse control line 102 according to the intensity of the reflected light from the object. Even in this case, reflected light from an object at a short distance corresponding to the stray light saturation time 121 cannot be detected, so the control unit 11 cannot perform control according to the intensity of the reflected light.

In step S106, the control unit 11 controls the voltage and/or current output from the variable power supply unit 12, thereby setting the output of the laser beam emitted from the laser emitter 14 to a relatively small state (low output).

In step S107, the control unit 11 performs short-distance measurement. More specifically, first, the control unit 11 emits the low-output laser beam (second laser beam) from the laser emitter 14 via the separator 15 and the scanner 16 according to the ON state and the OFF state of the pulse driving unit 13. Next, the control unit 11 receives a signal relating to the reflected light from the object detected by the detector 17 and converted and amplified by the amplifier 18. Then, the control unit 11 calculates (measures) a distance to the object using a period from the time when where the pulse driving unit 13 is controlled to the ON state to the time when the control unit 11 receives the signal from the amplifier 18.

In step S108, the control unit 11 determines whether the scanning angle θ of the scanner 16 is the minimum value. In a case where the control unit 11 determines that the scanning angle θ is the minimum value, this flow ends. In a case where the control unit 11 determines that the scanning angle θ is not the minimum value, the process of step S109 is executed.

In step S109, the control unit 11 controls the scanner 16 so as to decrease the scanning angle θ of the scanner 16.

By repeating the processing of steps S107 and S109, the laser emitter 14 emits a low-output laser beam, and the stray light saturation time 121 becomes short. Therefore, object detection and distance measurement can be sequentially performed in a scanning range (second scanning range) 125, which is a short distance in the scanning range of the scanner 16.

Figure 6:
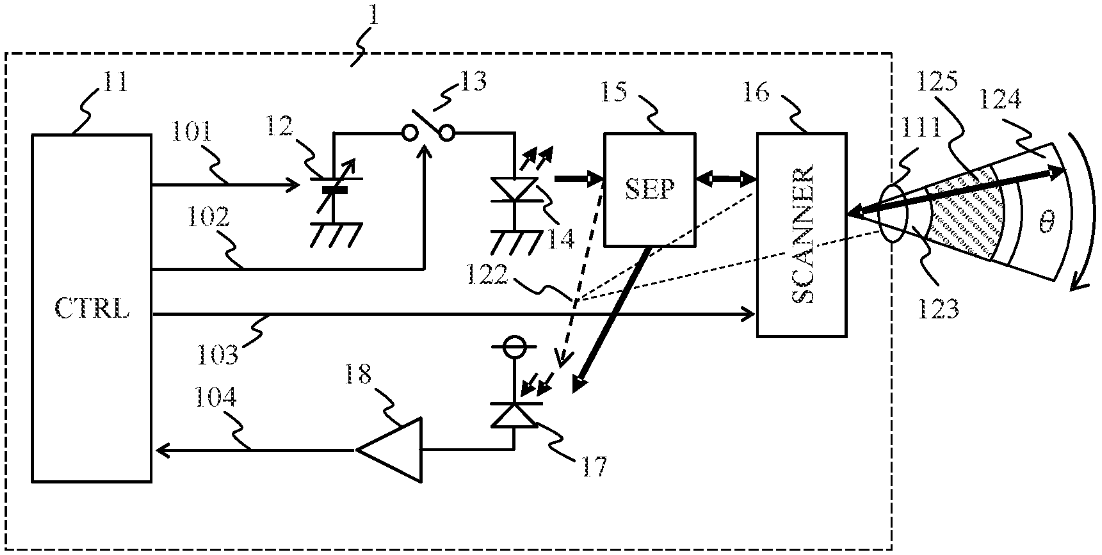
FIG. 6 illustrates how stray light enters the detector and the scanning range in step S107 of FIG. 2.

FIG. 6 illustrates how the stray light 122 enters the detector 17 and the scanning range in step S107 of FIG. 2. In step S107, since the output of the laser beam emitted from the laser emitter 14 is relatively low, object detection and distance measurement cannot be performed in the scanning range 124, which is a long distance in the scanning range of the scanner 16. However, since the stray light saturation time 121 is shortened, the corresponding scanning range 123 is reduced to a very short range within the scanning range of the scanner 16, and object detection and distance measurement can be performed in a relatively short-distance scanning range 125.

Figure 7:
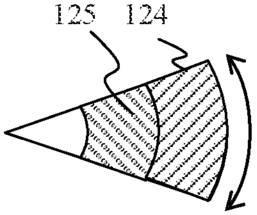
FIG. 7 illustrates the scanning range of the first embodiment displayed on the display unit.

This embodiment combines the result of long-distance measurement acquired in step S103 and the result of short-distance measurement acquired in step S107, and performs object detection and distance measurement over a wide range from a short distance to a long distance. That is, the scanning range can be combined (extended). FIG. 7 illustrates a scanning range in this embodiment acquired by combining the scanning ranges 124 and 125 displayed on the display unit (not illustrated) by the display control unit 11*e*. For example, for the scanning range of the scanner 16, if the long-distance measurement needs 0.1 seconds and the short-distance measurement needs 0.1 seconds, object detection and distance measurement can be performed five times per second by repeating the processing (the flow in FIG. 2) every 0.2 seconds. Thus, in this embodiment, the laser radar apparatus 1 alternately measures a plurality of scanning ranges and repetitively acquires distance measurement results. Thereby, object detection and distance measurement can be performed quickly even in a case where an object enters a wide range.

Second Embodiment

This embodiment is different from the first embodiment in that the scanner is configured to be able to perform two-axis scanning along the mutually orthogonal X-axis and Y-axis. This embodiment will discuss only configurations different from those of the first embodiment, and omit a detailed description of common configurations.

Figure 8:
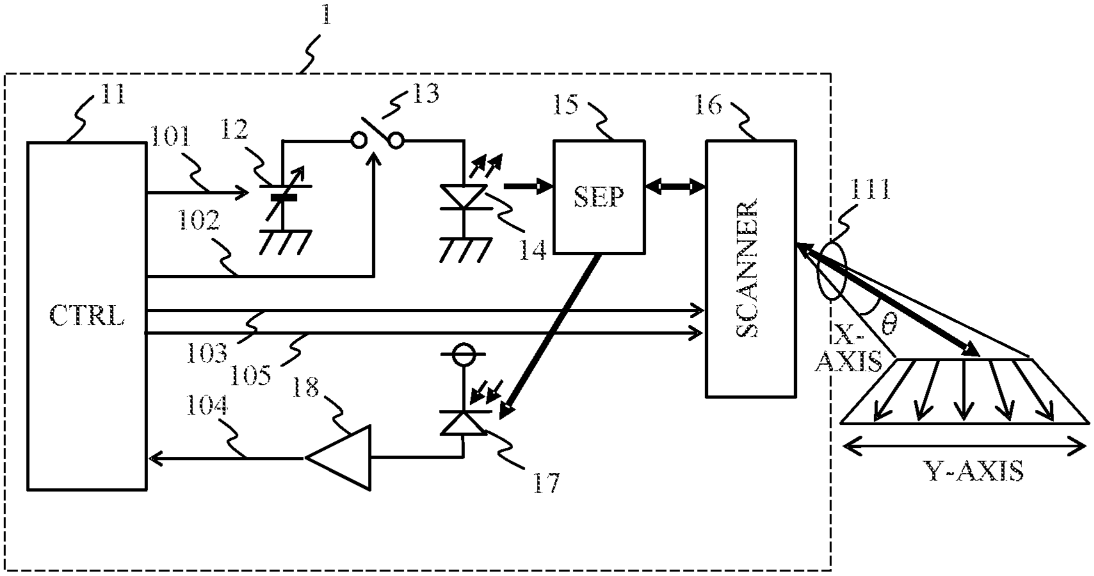
FIG. 8 is a configuration diagram of a laser radar apparatus according to a second embodiment.
Figure 9:
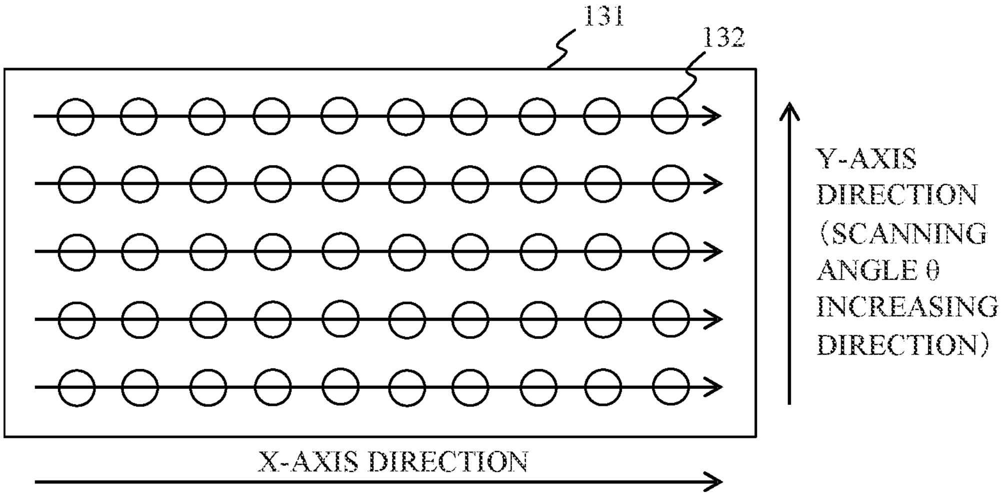
FIG. 9 illustrates a scanning range of the laser radar apparatus according to the second embodiment.

FIG. 8 is a configuration diagram of a laser radar apparatus 1 according to this embodiment. FIG. 9 illustrates a scanning range of a scanner 16 according to this embodiment.

The scanner 16 emits a laser beam at a predetermined scanning angle and receives reflected light from an object at a predetermined scanning angle to perform scanning in the Y-axis direction, and fast scanning at a plurality of scanning angles in the X-axis direction (scanning direction). In order to perform scanning in the X-axis direction and the Y-axis direction, the scanner 16 according to this embodiment has at least two driving units such as motors. Scanning in the Y-axis direction is performed by increasing or decreasing the scanning angle θ according to the signal indicating the control voltage value input via the scanning control line 103, as in the first embodiment. Scanning in the X-axis direction is performed linearly in a predetermined angular range or length according to the signal indicating the control voltage value input via a second scanning control line 105. Due to this configuration, object detection and distance measurement in the scanning range 131 can be performed.

Figure 10:
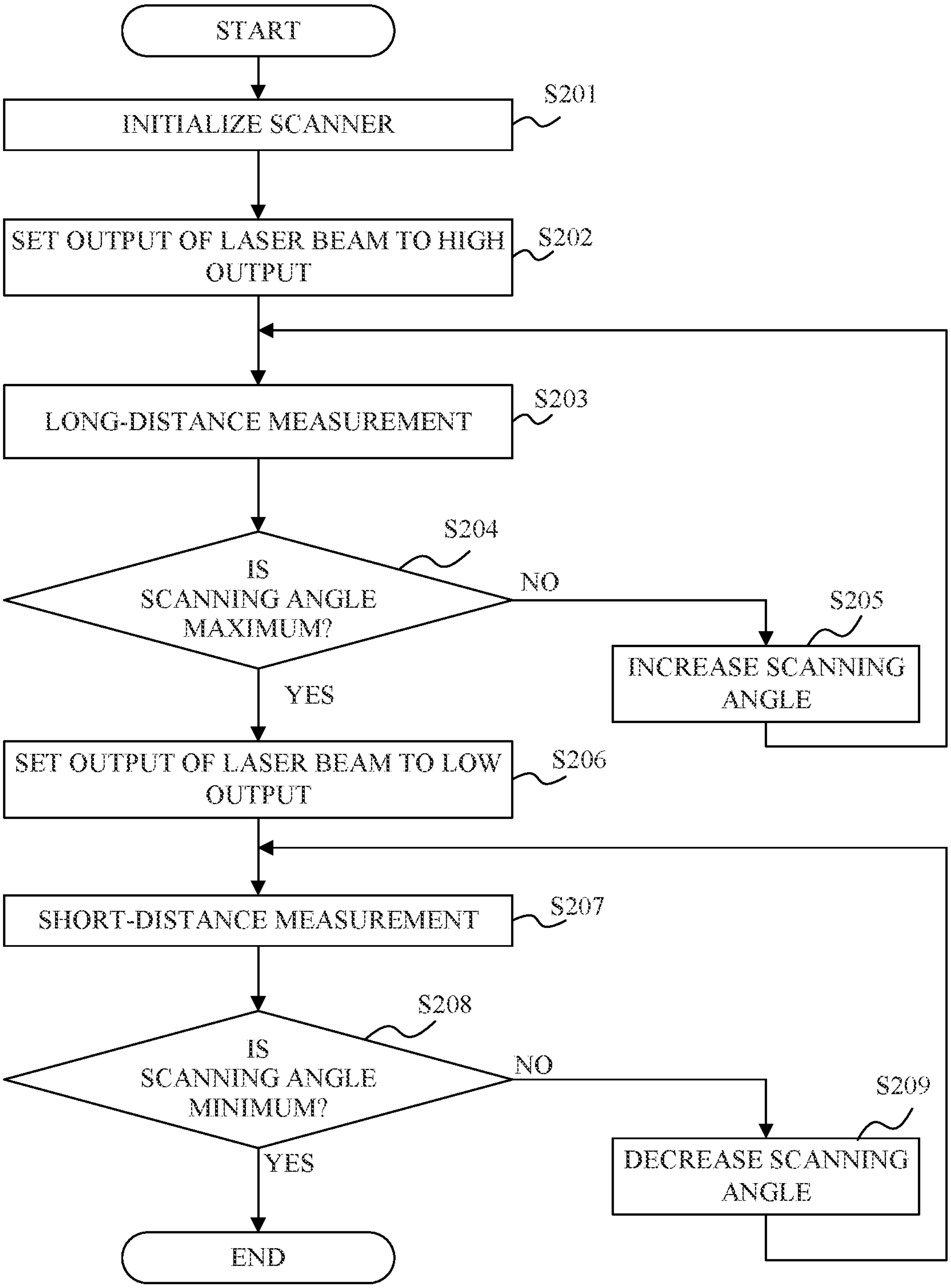
FIG. 10 is a flowchart illustrating a control operation by a control unit according to the second embodiment.

FIG. 10 is a flowchart illustrating a control operation by the control unit 11 according to this embodiment. In a case where the laser radar apparatus 1 starts operating, the flow of FIG. 10 is started.

Steps S201 and S202 correspond to steps S101 and S102 in FIG. 2, respectively, so a detailed description thereof will be omitted.

In step S203, the control unit 11 causes the laser emitter 14 to emit a high-power laser beam, and performs object detection or distance measurement at a plurality of points 132 within a predetermined angle range or length in the X-axis direction. By repeating the processing of step S203, long-distance object detection and distance measurement can be performed.

Steps S204 to S206 correspond to steps S104 to S106 in FIG. 2, respectively, so a detailed description thereof will be omitted.

In step S207, the control unit 11 causes the laser emitter 14 to emit a low-power laser beam, and performs object detection or distance measurement at a plurality of points 132 within a predetermined angular range or length in the X-axis direction. By repeating the processing of step S207, short-distance object detection and distance measurement can be performed.

This embodiment combines the result of long-distance measurement and the result of short-distance measurement, and performs object detection and distance measurement in a wide range from a short distance to a long distance in the X-axis direction.

Third Embodiment

This embodiment is different from the first embodiment in that different distance measurements (processing in steps S103 and S107) are performed according to the scanning angle of the scanner. More specifically, in a case where the scanning angle of the scanner is wider than a predetermined angle, long-distance measurement is performed, and in a case where the scanning angle of the scanner is narrower than the predetermined angle, short-distance measurement is performed. This embodiment will discuss only configurations different from those of the first embodiment, and omit a detailed description of common configurations.

Figure 11:
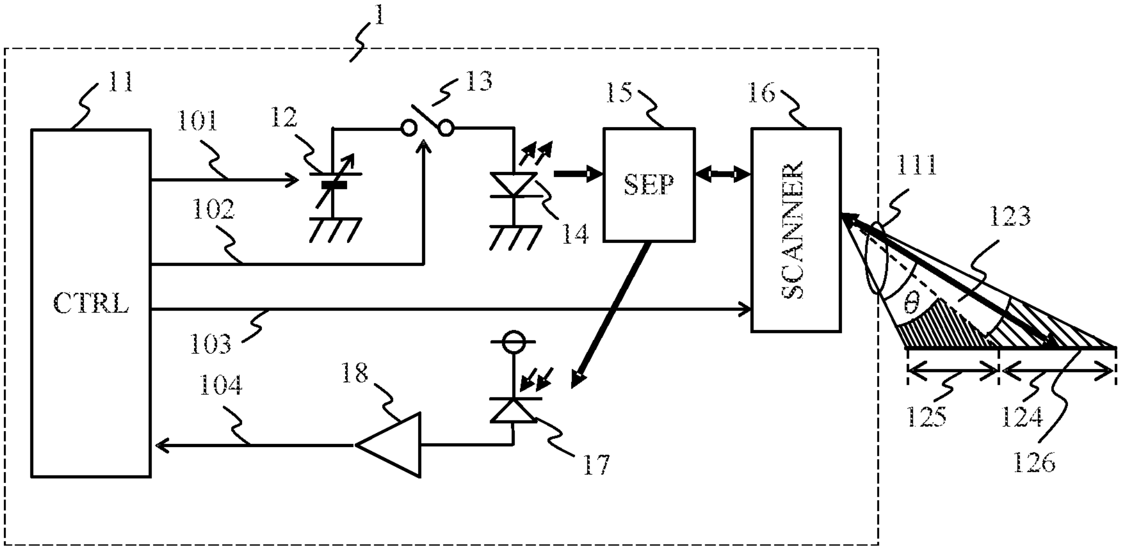
FIG. 11 is a configuration diagram of a laser radar apparatus according to a third embodiment.

FIG. 11 is a configuration diagram of a laser radar apparatus 1 according to this embodiment. The laser radar apparatus 1 performs object detection and distance measurement near a measurement surface 126 having a relatively short-distance scanning range 125 and a relatively long-distance scanning range 124.

Figure 12:
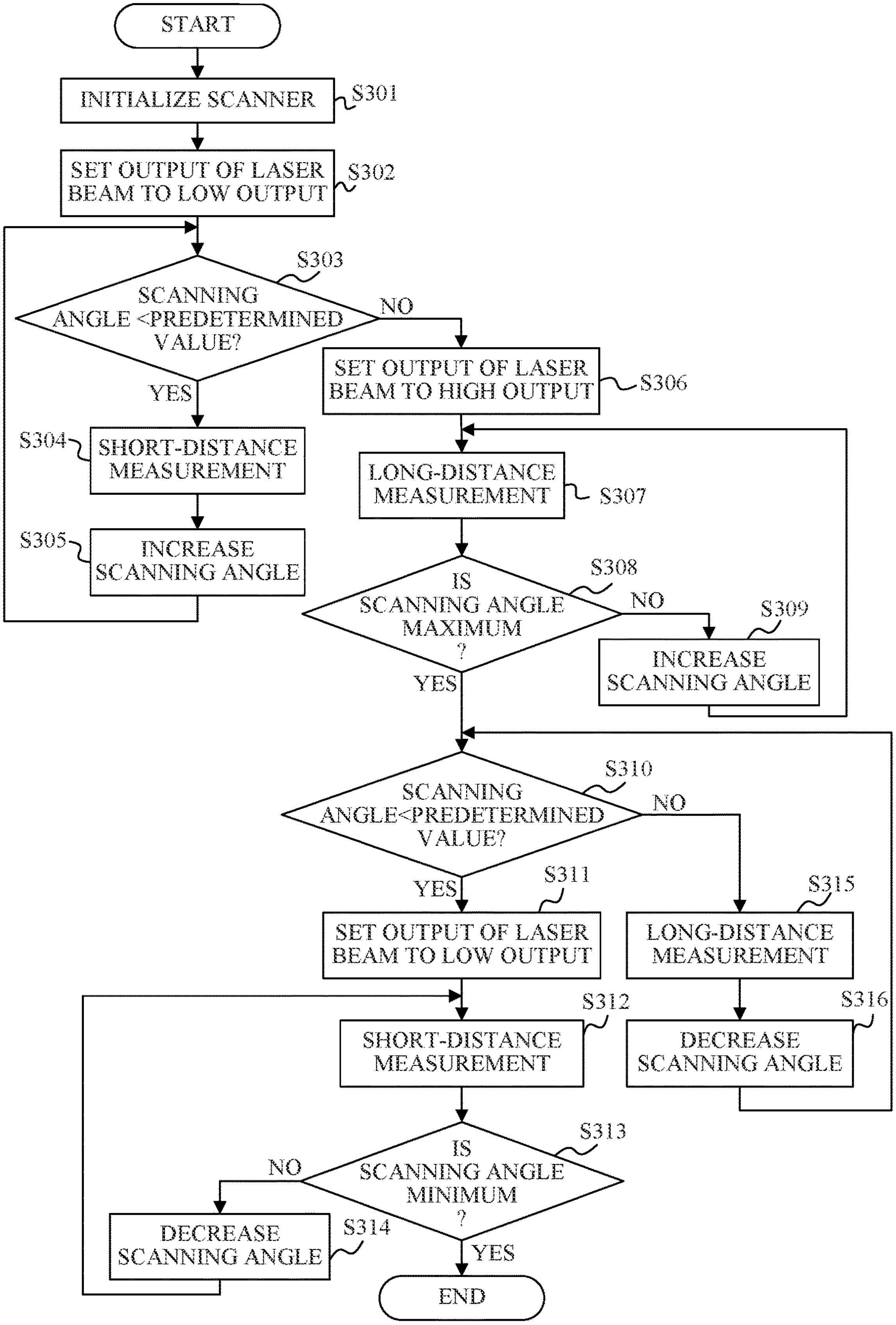
FIG. 12 is a flowchart illustrating a control operation by a control unit according to the third embodiment.
Figure 13:
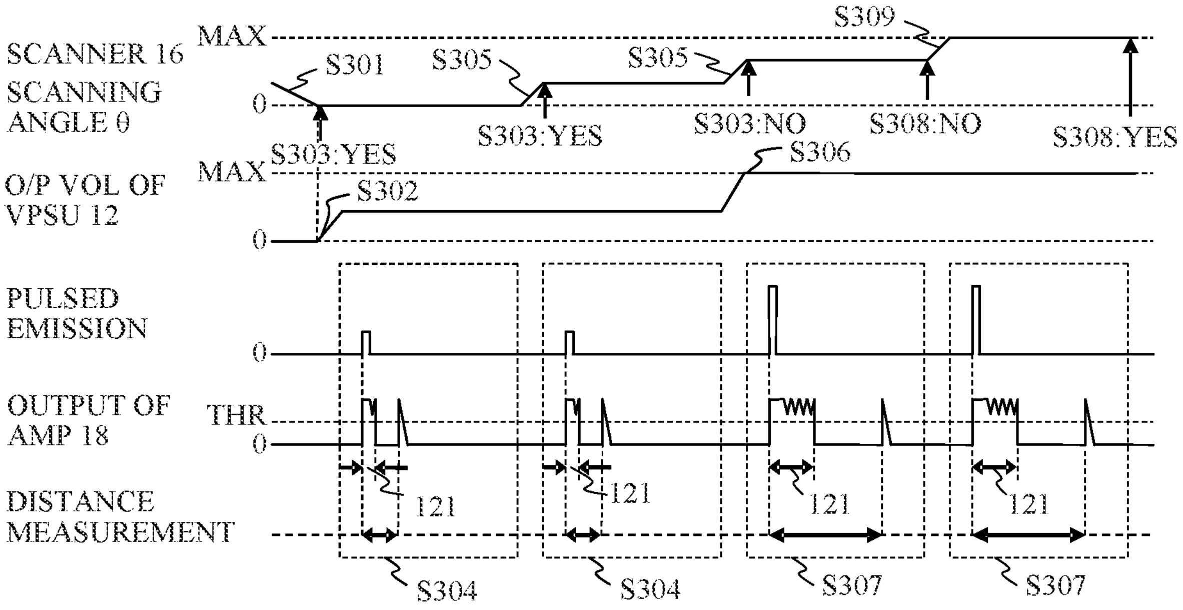
FIG. 13 illustrates a waveform of each part in each step in FIG. 12.

FIG. 12 is a flowchart illustrating the control operation by the control unit 11 according to this embodiment. In a case where the laser radar apparatus 1 starts operating, the flow of FIG. 12 is started. FIG. 13 illustrates a waveform of each part in each step in FIG. 12. A horizontal axis represents time.

Steps S301 and S302 correspond to steps S101 and S106 in FIG. 2, respectively, and a detailed description thereof will be omitted.

In step S303, the control unit 11 determines whether the scanning angle of the scanner 16 is smaller than a predetermined value. In a case where the control unit 11 determines that the scanning angle is smaller than the predetermined value, the process of step S304 is executed. In a case where the control unit 11 determines that the scanning angle is larger than the predetermined value, the processing of step S306 is executed. In a case where the scanning angle is equal to a predetermined value, which step is to be executed may be arbitrarily set.

Steps S304 and S305 correspond to steps S107 and S105 in FIG. 2, respectively, and a detailed description thereof will be omitted.

Step S306 to step S309 correspond to step S102 to step S105 in FIG. 2, respectively, and a detailed description thereof will be omitted.

In step S310, the control unit 11 determines whether the scanning angle of the scanner 16 is smaller than the predetermined value. In a case where the control unit 11 determines that the scanning angle is smaller than the predetermined value, the process of step S311 is executed. In a case where the control unit 11 determines that the scanning angle is larger than the predetermined value, the processing of step S315 is executed. In a case where the scanning angle is equal to the predetermined value, which step is to be executed may be arbitrarily set.

Steps S311 to S314 correspond to steps S106 to S109 in FIG. 2, respectively, and a detailed description thereof will be omitted.

Steps S315 and S316 correspond to steps S103 and S109 in FIG. 2, respectively, so a detailed description thereof will be omitted.

In the scanning angle θ of the scanner 16 between approximately zero and the maximum value, this embodiment can perform object detection and distance measurement suitable for each of the relatively short-distance scanning range 125 and the relatively long-distance scanning range 124.

On-Board System (in-Vehicle System)

Figure 14:
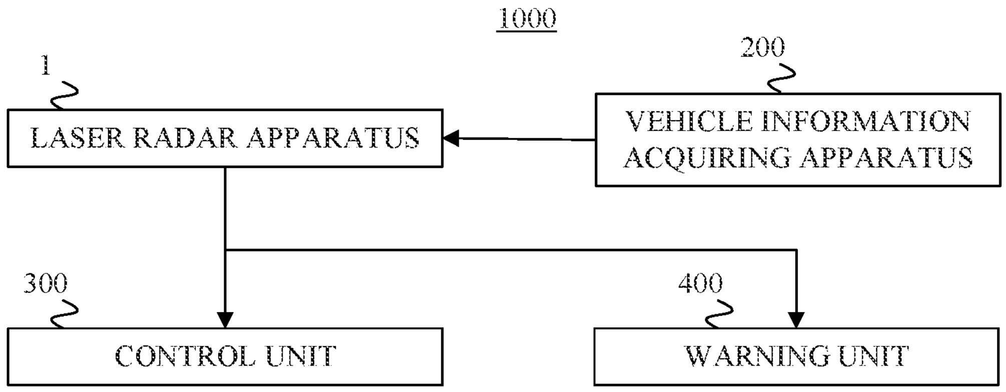
FIG. 14 is a configuration diagram of an on-board (in-vehicle) system.

FIG. 14 illustrates the configuration of the laser radar apparatus according to each embodiment an on-board system 1000 (driving support apparatus) having the same.

Figure 15:
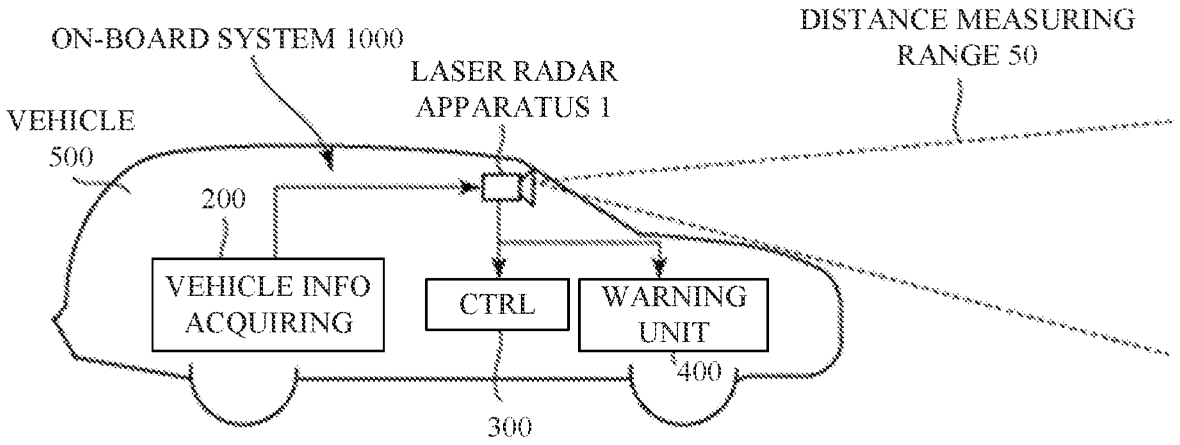
FIG. 15 is a schematic diagram of a vehicle (moving apparatus).

The on-board system 1000 is an apparatus held by a moving apparatus (moving body) such as an automobile (vehicle), and configured to assist the user in driving (steering) the vehicle based on distance information to an object such as an obstacle and a pedestrian around the vehicle acquired by the laser radar apparatus 1. FIG. 15 schematically illustrates a vehicle (moving apparatus) 500 including the on-board system 1000. In FIG. 15, a distance measuring range (detection range) of the laser radar apparatus 1 is set in front of the vehicle 500, but the distance measuring range may be set in the rear or side of the vehicle 500, for example.

As illustrated in FIG. 14, the on-board system 1000 includes the laser radar apparatus 1, a vehicle information acquiring apparatus 200, a control unit (ECU: electronic control unit) 300, and a warning unit 400. In the on-board system 1000, the control unit 11 provided in the laser radar apparatus 1 has functions as a distance acquiring unit and a collision determining unit. However, if necessary, the on-board system 1000 may include a distance acquiring unit and a collision determining unit separate from the control unit 11, and each may be provided outside the laser radar apparatus 1 (for example, inside the vehicle 500). Alternatively, the control unit 300 may be used as the control unit 11.

Figure 16:
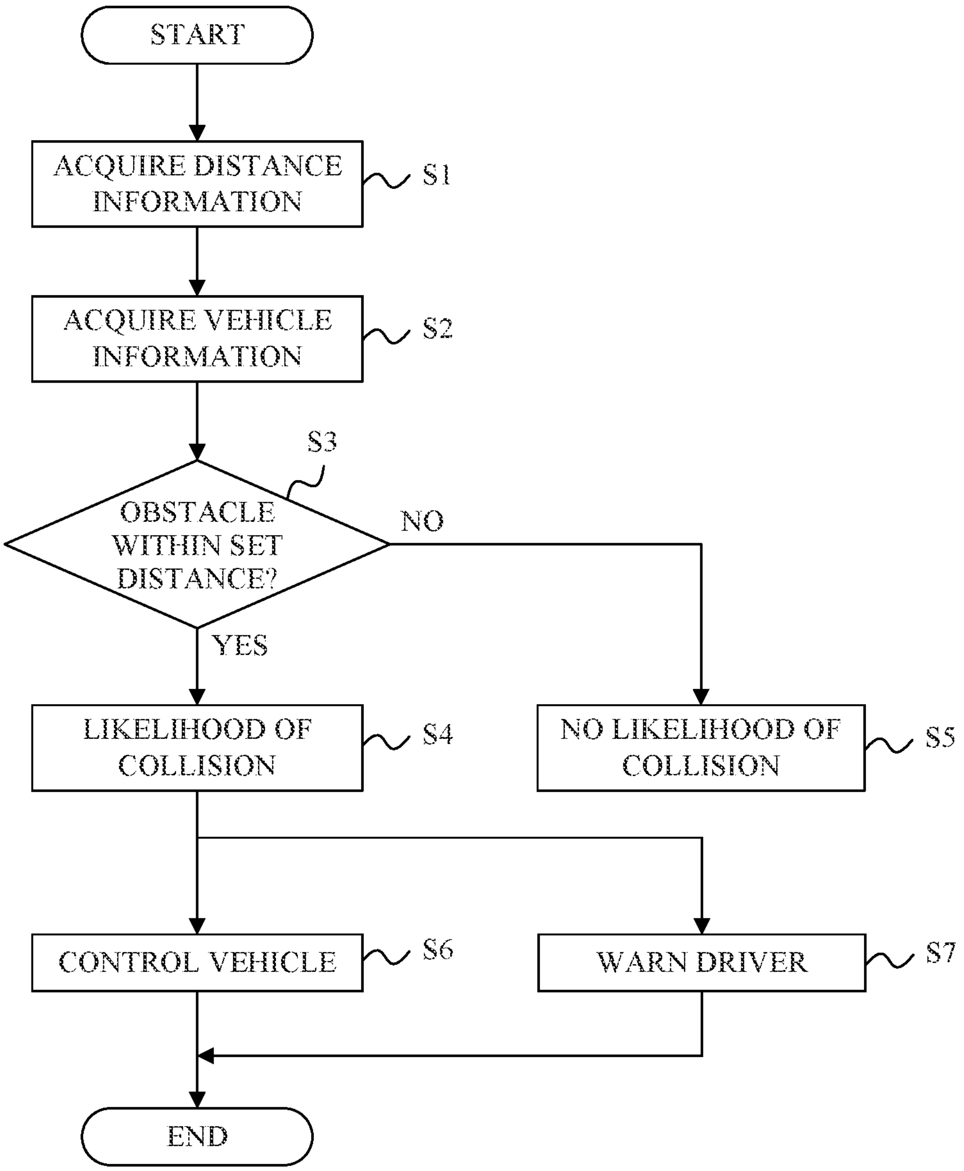
FIG. 16 is a flowchart illustrating an operation example of the on-board system.

FIG. 16 is a flowchart illustrating an illustrative operation of the on-board system 1000. The operation of the on-board system 1000 will be described below along this flowchart.

First, in step S1, an object around the vehicle is illuminated by the laser emitter 14 in the laser radar apparatus 1, and light reflected from the object is received, and the control unit 11 acquires distance information to the object based on the signal output from the detector 17. In step S2, the vehicle information acquiring apparatus 200 acquires vehicle information including the vehicle speed, yaw rate, steering angle, and the like. In step S3, the control unit 11 determines whether or not the distance to the object is within the preset distance range using the distance information acquired in step S1 and the vehicle information acquired in step S2.

Thereby, the control unit 11 can determine whether or not the object exists within a set distance around the vehicle, and can determine the likelihood of collision between the vehicle and the object. Steps S1 and S2 may be performed in the order opposite to the order described above, or may be performed in parallel. The control unit 11 determines that there is a "likelihood of collision" in a case where the object exists within the set distance (step S4), and determines that there is no likelihood of collision in a case where the object does not exist within the set distance (step S5).

In a case where the control unit 11 determines that there is the likelihood of collision, the control unit 60 notifies (transmits) the determination result to the control unit 300 and the warning unit 400. In step S6, the control unit 300 controls the vehicle based on the determination result of the control unit 11. In step S7, the warning unit 400 warns the user (driver) of the vehicle based on the determination result of the control unit 11. The determination result may be notified to at least one of the control unit 300 and the warning unit 400.

The control unit 300 can control the movement of the vehicle by outputting a control signal to a driving unit (engine, motor, etc.) of the vehicle. For example, the control unit 300 performs control such as applying a brake in a vehicle, releasing an accelerator, turning a steering wheel, generating a control signal for generating a braking force in each wheel, and suppressing an output of an engine or a motor. The warning unit 400 warns the driver, for example, by emitting a warning sound, displaying warning information on a screen of a car navigation system, vibrating the seat belt or steering wheel, or the like.

The on-board system 1000 described above can detect the object, measure the distance to the object through the above processing, and avoid collision between the vehicle and the object. In particular, applying the laser radar apparatus 1 according to each example to the on-board system 1000 can achieve high distance measuring accuracy, and thus can detect an object and detect collisions with high accuracy.

This example applies the on-board system 1000 to driving support (collision damage reduction), but the on-board system 1000 can be applied to cruise control (including adaptive cruise control function), automatic driving, etc. The on-board system 1000 can be applied not only to vehicles such as automobiles, but also to various moving apparatuses such as ships, aircraft, and industrial robots. The on-board system 1000 can be applied not only to moving apparatuses but also to various apparatuses that use object recognition, such as the intelligent transportation system (ITS) and monitoring systems.

The on-board system 1000 and the vehicle 500 may include a notification apparatus (notification unit) configured to notify the on-board system manufacturer and the moving apparatus distributor (dealer) of the fact of the collision in a case where the vehicle 500 collides with an obstacle. For example, the notification apparatus may transmit information (collision information) about the collision between the vehicle 500 and the obstacle to a preset external notification destination by e-mail or the like.

Thus, the configuration that automatically notifies the collision information through the notification apparatus can promptly respond to inspections, repairs, etc. after the collision occurs. The notification destination of the collision information may be an insurance company, a medical institution, the police, and an arbitrary notification destination set by the user. The notification apparatus may be configured to notify the notification destination not only of the collision information but also of failure information about each part and consumption information about consumables. The presence or absence of collision may be detected using distance information acquired based on the output from the detector 17, or may be performed by another detector (sensor).

This embodiment can provide a control apparatus for implementing a small laser radar apparatus configured to perform object detection and distance measurement over a wide range from a long distance to a short distance.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-141963, filed on Sep. 7, 2022, which is hereby incorporated by reference herein in its entirety.

What is claimed is:

1. A control apparatus configured to control a laser radar apparatus including a light source, a scanner, and a detector, wherein the scanner is configured to deflect a laser beam from the light source, scan an object and deflect reflected light from the object, wherein the detector is configured to detect the reflected light, the control apparatus further being configured to acquire information about the object based on an output from the detector, wherein the control apparatus comprises:

a memory storing instructions; and a processor configured to execute the instructions to:

cause the light source to emit a first laser beam having a first output value by causing a first signal having a first signal value to be supplied to the light source, wherein the processor is configured to cause the first signal having the first signal value to be supplied to the light source while a scanning angle of the scanner changes from a minimum value to a maximum value, without determining whether to supply the first signal having the first signal value based on the information about the object acquired based on the output from the detector, and cause the light source to emit a second laser beam having a second output value smaller than the first output value by causing a second signal having a second signal value smaller than the first signal value to be supplied to the light source, wherein the processor is configured to cause the second signal having the second signal value to be supplied to the light source while the scanning angle of the scanner changes from the maximum value to the minimum value, without determining whether to supply the second signal having the second signal value based on the information about the object acquired based on the output from the detector;

acquire information about the object in a first scanning range in a scanning range of the scanner in a case where the first laser beam is emitted;

acquire information about the object in a second scanning range in the scanning range of the scanner closer to the scanner than the first scanning range in a case where the second laser beam is emitted; and cause a display to display information acquired by combining the information about the object in the first scanning range and the information about the object in the second scanning range.

2. The control apparatus according to claim 1, wherein the processor is configured to change a signal to be supplied to the light source according to a scanning angle of the scanner.

3. The control apparatus according to claim 1, wherein the scanner is configured to scan in a first scanning direction and a second scanning direction that are orthogonal to each other, wherein the processor is configured to:

cause the first signal to be supplied to the light source while a scanning angle in the first scanning direction of the scanner changes from a minimum value to a maximum value, and cause the second signal to be supplied to the light source while the scanning angle in the first scanning direction changes from the maximum value to the minimum value.

4. The control apparatus according to claim 1, wherein the processor is configured to alternately perform processing of acquiring the information about the object in the first scanning range and processing of acquiring the information about the object in the second scanning range.

5. A laser radar apparatus comprising:

a light source configured to emit a laser beam;

a scanner configured to deflect a laser beam from a light source, to scan an object, and to deflect reflected light from the object;

a detector configured to detect the reflected light; and the control apparatus according to claim 1.

6. The laser radar apparatus according to claim 5, further comprising a pulse driver configured to cause the light source to emit pulsed light.

7. An on-board system comprising the laser radar apparatus according to claim 5, wherein the on-board system determines a likelihood of collision between a moving apparatus and the object based on information about the object acquired by the laser radar apparatus.

8. The on-board system according to claim 7, wherein the instructions, when executed by the processor, further cause the control apparatus to output a control signal for generating a braking force to the moving apparatus in a case where the control apparatus determines that there is the likelihood of collision between the moving apparatus and the object.

9. The on-board system according to claim 7, wherein the instructions, when executed by the processor, further cause the control apparatus to warn a driver of the moving apparatus in a case where it is determined that there is the likelihood of collision between the moving apparatus and the object.

10. A moving apparatus comprising the laser radar apparatus according to claim 5, wherein the moving apparatus is configured to hold the laser radar apparatus.

11. The moving apparatus according to claim 10, wherein the instructions, when executed by the processor, further cause the control apparatus to determine a likelihood of collision between the moving apparatus and the object based on information about the object acquired by the laser radar apparatus.

12. The moving apparatus according to claim 11, wherein the instructions, when executed by the processor, further cause the control apparatus to output a control signal for controlling movement of the moving apparatus in a case where it is determined that there is the likelihood of collision between the moving apparatus and the object.

13. The moving apparatus according to claim 11, wherein the instructions, when executed by the processor, further cause the control apparatus to warn a driver of the moving apparatus in a case where it is determined that there is the likelihood of collision between the moving apparatus and the object.

14. A control method for controlling a laser radar apparatus, wherein the laser radar apparatus includes a light source, a scanner, and a detector, wherein the scanner is configured to deflect a laser beam from the light source, to scan an object, and to deflect reflected light from the object, wherein the detector is configured to detect the reflected light, and wherein information about the object is acquired based on an output from the detector, the control method comprising the steps of:

causing the light source to emit a first laser beam having a first output value by causing a first signal having a first signal value to be supplied to the light source while a scanning angle of the scanner changes from a minimum value to a maximum value, without determining whether to supply the first signal having the first signal value based on the information about the object acquired based on the output from the detector;

causing the light source to emit a second laser beam having a second output value smaller than the first output value by causing a second signal having a second signal value smaller than the first signal value to be supplied to the light source, wherein the second signal having the second signal value is configured to be supplied to the light source while the scanning angle of the scanner changes from the maximum value to the minimum value, without determining whether to supply the second signal having the second signal value based on the information about the object acquired based on the output from the detector;

acquiring information about the object in a first scanning range in a scanning range of the scanner in a case where the first laser beam is emitted;

acquiring information about the object in a second scanning range in the scanning range of the scanner closer to the scanner than the first scanning range in a case where the second laser beam is emitted; and causing a display to display information acquired by combining the information about the object in the first scanning range and the information about the object in the second scanning range.

15. A non-transitory computer-readable storage medium storing a program that causes a computer to execute the control method according to claim 14.

* * * * *